Oct. 26, 1965    G. E. BROWN, JR    3,214,216
DISPOSABLE WINDSHIELD CANOPY
Filed Dec. 31, 1962    2 Sheets-Sheet 1
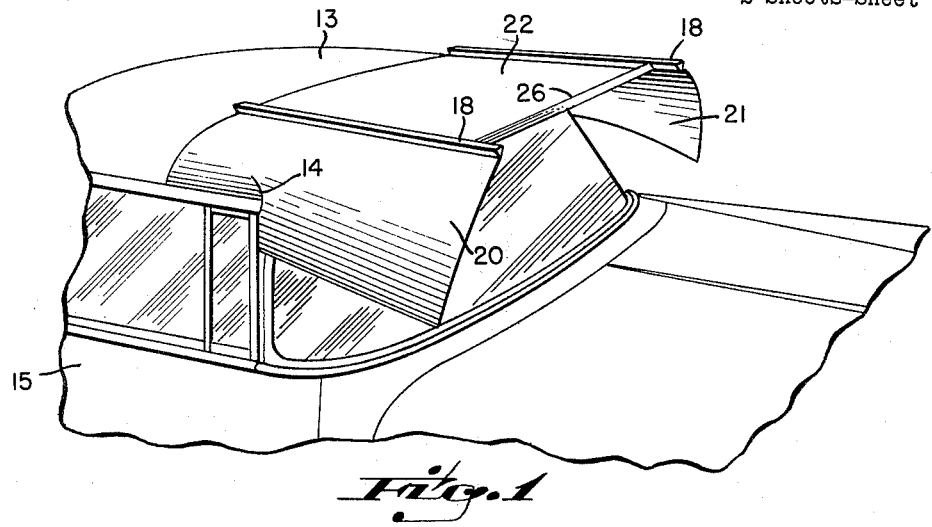
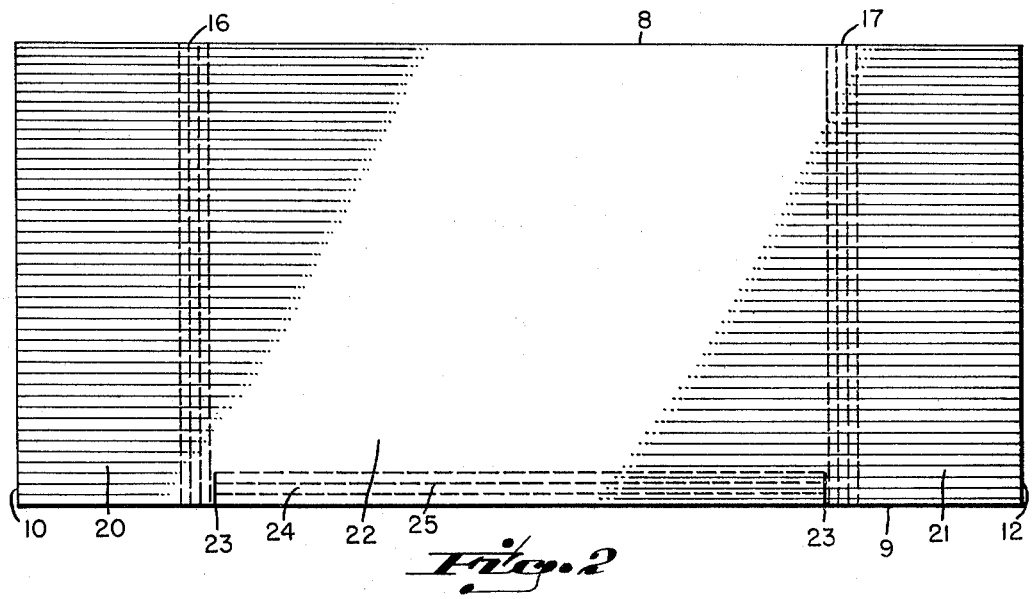
INVENTOR.
GEORGE E. BROWN, JR.
BY
ATTORNEY Oct. 26, 1965  G. E. BROWN, JR  3,214,216
DISPOSABLE WINDSHIELD CANOPY
Filed Dec. 31, 1962  2 Sheets-Sheet 2
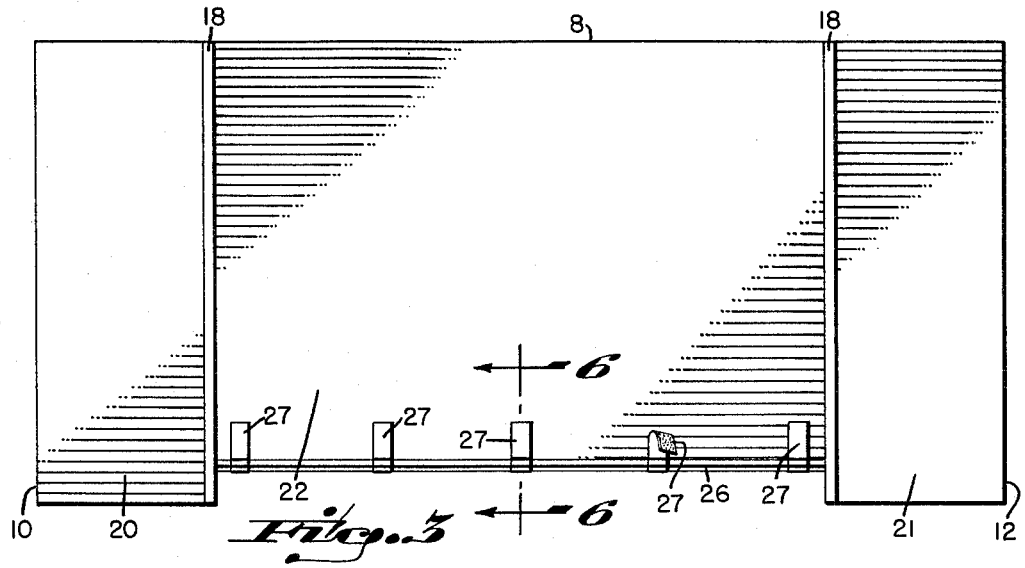
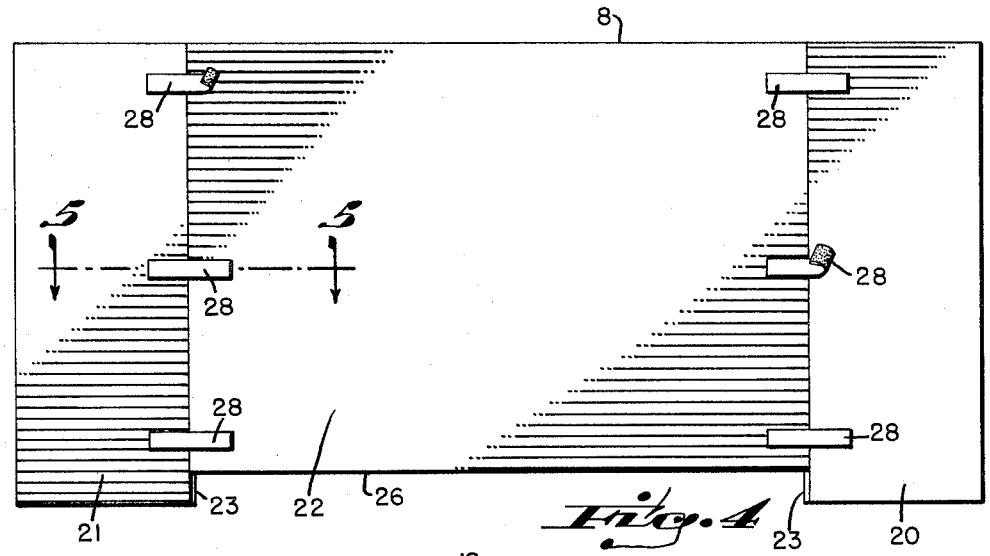
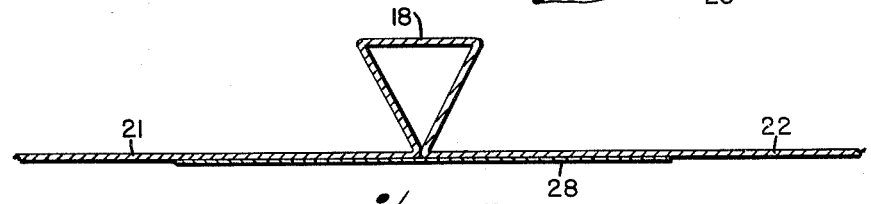
INVENTOR.
GEORGE E. BROWN, JR.
BY
ATTORNEY

United States Patent Office 3,214,216
Patented Oct. 26, 1965

3,214,216
DISPOSABLE WINDSHIELD CANOPY
George E. Brown, Jr., Box 1113, Glendale, Ohio
Filed Dec. 31, 1962, Ser. No. 248,354
5 Claims. (Cl. 296—95)

The present invention relates to a windshield canopy.

An object of the invention is to provide an inexpensive protective canopy of flexible paperboard or similar sheet material, to be quickly mounted above an automobile windshield for warding off rain or snow while the vehicle is not in motion. The canopy is particularly useful for keeping the windshield clear while the occupants of a vehicle are viewing outdoor movies, concerts, lectures, and other performances or displays conducted at vehicle parking areas.

Another object is to provide a device for the purpose stated, which is so inexpensive as to be furnished as a give-away or throw-away item, if desired; however, the device is capable of re-use several times if stored and dried after each use.

A further object is to provide a temporary canopy of the character mentioned, which is so constructed as to withstand considerable use and handling, and which may be mounted over a vehicle windshield with a minimal expenditure of time and effort, no tools being required.

Another object is to provide a device of the character stated which may be shipped and stored in flat condition, thereby saving storage space and shipping expense, as well as manufacturing cost.

A further object is to provide a device of the character stated, which, notwithstanding the employment of inexpensive paperboard or cardboard in its construction, is nevertheless relatively durable and rigid to perform the service intended.

The foregoing and other objects are attained by the means described herein and illustrated upon the accompanying drawings, in which:

FIG. 1 is a fragmental perspective view of the canopy supported over an automobile windshield.

FIG. 2 is a top plan view of the canopy in flat shipping or storing condition.

FIG. 3 is a top plan view showing the canopy set up for use.

FIG. 4 is a bottom view of FIG. 3.

FIG. 5 is an enlarged cross-section taken on line 5—5 of FIG. 4.

FIG. 6 is an enlarged cross-section taken on line 6—6 of FIG. 3.

The canopy in brief is constructed of a single piece of flexible cardboard, paperboard, or similar inexpensive sheet material which may be either corrugated or plain, and if so desired, it may be treated with a water-repellant substance commonly employed to render the material somewhat impervious to water or moisture. In the manufacture, the sheet is cut or shaped as a rectangular panel having opposite parallel sides 8 and 9, and opposite parallel ends 10 and 12. The full length of the panel exceeds to some extent the distance across the vehicle top 13 in the region of the front doors, so that the end portions of the panel may be gripped between the doors and their jambs incident to closing the doors upon the panel ends.

In FIG. 1, 14 indicates a wrinkle in the panel resulting from closing the door 15 thereon. After a door at one side of the vehicle is closed upon the panel according to FIG. 1, the panel may be drawn taut across the vehicle top and gripped by the other front door when closed thereon. Thus, both ends of the panel are securely held by the pinching action of the doors against their respective jambs on the vehicle body.

In the course of manufacture, the panel may be scored transversely to provide a first group of score lines 16 and a second group of score lines 17, all of which are substantially parallel to one another. The scores of each group may be equally spaced apart as shown, and the distance between the groups may be substantially less than the transverse measurements across the top of the average vehicle in the region of the front doors.

The number of score lines in each group may be four, as shown, to permit transverse bending of the sheet in folds providing a reinforcing rib 18 upstanding upon the canopy panel. Three or more score lines in each group will form a suitable reinforcing rib, as will be understood. It will be appreciated also that the number of score line groups extending across the panel of FIG. 2 is a matter of choice, although two such groups as shown is considered adequate.

The groups of score lines 16 and 17 divide the panel into three sections, namely, two end sections 20 and 21, and a middle or intermediate section 22. Between the end sections, and preferably close to the innermost score lines of the two groups, the panel is provided with short slits or through cuts 23 forming a longitudinal flap 24 extending lengthwise of the middle section 22. The slits 23 may be substantially perpendicular to the side 9 of the panel, and between the slits may be provided a group of parallel score lines 25 running lengthwise of the flap 24, or in parallelism with the free edge of side 9 of the panel. The number of score lines in group 25 may be varied, although three are shown upon the drawings to form, when folded upon one another, a forward upstanding reinforcing rib 26 which is generally triangular in cross-section. Rib 26 reinforces the forward edge of the canopy midsection 22, as indicated upon FIGS. 3 and 6.

The form of the several reinforcing ribs 18 and 26 may be fixed or maintained by applying thereto a number of gummed strips or pressure-sensitive tapes 27 and 28; or, if preferred, fixation may be achieved in other ways, as by means of mechanical clips or fasteners such as staples, or tongues and slits as commonly utilized in cardboard box assembly. In any event, means should be provided for maintaining the reinforcing rib formation either temporarily or permanently.

In practice, a supplier or seller of the devices may keep them on hand in the flat form of FIG. 2, and may furnish them to patrons along with the necessary tapes or fasteners such as 27–28. The patron simply bends the panel along the score lines provided, to form the reinforcing ribs 18 and 26, and applies the fastening means 27–28. The canopy so formed may then be placed upon the vehicle top to overhang the windshield as in FIG. 1, open the vehicle doors, and then close them upon the end sections 20 and 21, to effect the mounting of the canopy upon the vehicle.

The windshield of the vehicle is thereby kept clear of rain, snow, or mist, and after the canopy has served the desired purpose, it may be promptly released and removed by simply opening the vehicle doors. After use, the canopy may be discarded due to its low cost, or, if desired, it may be retained for re-use at a future time.

While the panel from which the canopy is fashioned is illustrated herein as a rectangular piece, it may obviously be afforded other shapes consistent with the utility of the device. It is to be understood that various other modifications and changes may be made in the structural details of the device, within the scope of the appended claims, without departing from the spirit of the invention.

What is claimed is:

1. A canopy for application to an automotive vehicle top in position to overhang the windshield thereof, comprising a single elongate flexible sheet of paperboard-like material having opposite ends and opposite sides defining the sheet, the sheet being transversely scored at locations near the ends thereof to provide a pair of end sections and an integral middle section, said scores being in multiple at each location to induce folding of the material to form reinforcing ribs upstanding upon a surface of the sheet, and means reinforcing the middle section against bending at one of the sheet sides, the sections being collectively of such length as to dispose portions of the end sections in position for clamping between the front doors and the door jambs of the vehicle body, while the sections rest upon the vehicle top in overhanging relationship to the windshield.

2. The device as set forth in claim 1, wherein the reinforcing means of the middle section comprises folds integral with the material of the middle section, extending lengthwise of said one sheet side from one of the transverse scores to the other.

3. A canopy for application to an automotive vehicle top in position to overhang the windshield thereof, comprising a single elongate sheet of flexible paperboard-like material, said sheet having opposite sides and opposite ends, the sheet being transversely scored at locations near the ends thereof to define a pair of end sections and an intervening middle section, said scores being in multiple at each location to induce folding of the material to form reinforcing ribs upstanding upon a surface of the sheet, the material of the middle section being slitted from one side thereof inwardly a limited distance to provide an elongate flap including said one side and reaching substantially from one of the multiple scores to the other, said flap being multiple scored longitudinally and in parallelism with said one side of the sheet to induce folding of the flap material to form a reinforcing rib extending lengthwise of the sheet, and means holding the folds in reinforcing rib formation, the end and middle sections being collectively of such length as to dispose portions of the end sections in position for clamping by the vehicle front doors when closed thereon.

4. The device as set forth in claim 3, wherein the paperboard-like material of the canopy is treated to render it substantially impervious to moisture.

5. A canopy for application to an automotive vehicle top in position to overhang the windshield thereof, comprising a single elongate sheet of flexible board material, said sheet having opposite sides and opposite ends, the sheet being transversely scored at locations near the ends thereof to define a pair of end sections and an intervening middle section, said scores being in multiple at each location to induce folding of the material to form reinforcing ribs upstanding upon a surface of the sheet, the material of the middle section being slitted adjacent to the transverse scores, from one side of the sheet inwardly a limited distance to define an elongate flap including said one side and reaching substantially from one of the transverse multiple scores to the other, said flap being scored longitudinally and in substantial parallelism with said one side of the sheet to induce folding of the flap material upon itself for reinforcement against bending, and means for holding the folds in the folded condition, the overall length of the elongate sheet being greater than the distance transversely across the vehicle top, whereby to dispose portions of the end sections in position for the front doors of the vehicle to close thereon and clamp the sheet in position across the top in overhanging relationship to the windshield.

References Cited by the Examiner
UNITED STATES PATENTS

| | | | |
|---|---|---|---|
| 1,158,130 | 10/15 | Hawkins | 229—49 |
| 2,085,460 | 6/37 | Williams | 229—49 |
| 2,444,183 | 6/48 | Cahners | 229—49 X |
| 2,766,923 | 10/56 | D'Esposito | 229—49 |
| 2,797,961 | 7/57 | McKay | 296—95 |
| 2,972,377 | 2/61 | Jacobs | 296—95 X |
| 2,989,339 | 6/61 | Southall | 296—95 |

A. HARRY LEVY, *Primary Examiner.*